(12) United States Patent
Rendon

(10) Patent No.: US 11,851,535 B1
(45) Date of Patent: *Dec. 26, 2023

(54) COPOLYMER WITH PROGRAMMABLE WATER SOLUBILITY

(71) Applicant: Timeplast, INC, Winter Springs, FL (US)

(72) Inventor: Manuel Rendon, Winter Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,154

(22) Filed: Mar. 29, 2023

Related U.S. Application Data

(63) Continuation-in-part of application No. 17/203,258, filed on Mar. 16, 2021.

(51) Int. Cl.
| | | |
|---|---|---|
| *C08L 23/00* | (2006.01) | |
| *C08L 23/04* | (2006.01) | |
| *C08L 29/04* | (2006.01) | |
| *C08J 3/00* | (2006.01) | |
| *C08J 3/11* | (2006.01) | |
| *C08J 3/14* | (2006.01) | |
| *C08L 23/16* | (2006.01) | |

(52) U.S. Cl.
CPC .............. *C08J 3/005* (2013.01); *C08J 3/11* (2013.01); *C08J 3/14* (2013.01); *C08J 2323/06* (2013.01); *C08J 2429/04* (2013.01); *C08L 23/04* (2013.01); *C08L 23/16* (2013.01); *C08L 29/04* (2013.01)

(58) Field of Classification Search
CPC .......... C08L 29/04; C08L 23/00; C08L 23/04; C08L 23/16; C08L 2034/42
See application file for complete search history.

(56) References Cited

U.S. PATENT DOCUMENTS

| | | | | |
|---|---|---|---|---|
| 3,997,489 | A * | 12/1976 | Coker | C08K 5/05 524/557 |
| 5,354,804 | A * | 10/1994 | Inada | C08J 3/03 524/502 |
| 5,389,709 | A * | 2/1995 | Itamura | C08L 23/02 525/61 |
| 6,544,661 | B1 * | 4/2003 | Lee | C08L 29/04 428/522 |
| 10,947,332 | B1 * | 3/2021 | Rendon | C08F 110/02 |
| 2007/0117905 | A1 * | 5/2007 | Toyoda | C08L 23/02 524/487 |

FOREIGN PATENT DOCUMENTS

KR 10-2017-0008916 A * 1/2017 .............. C08L 29/04

* cited by examiner

*Primary Examiner* — Rip A Lee
(74) *Attorney, Agent, or Firm* — SANCHELIMA & ASSOCIATES, P.A.; Christian Sanchelima; Jesus Sanchelima

(57) ABSTRACT

A copolymer composition including a method having a first step involving heating and submerging of water-resistant polymer into a solvent bath until the water-resistant polymer dissolves into the solvent bath resulting in a water-like solution. A second step includes precipitating the water-like solution forming a wax within the water-like solution. A third step involving filtering and distilling of the water-solution separating the wax from the solvent bath. A fourth step involving dispersing of the wax in a liquid carrier resulting in a combination. A fifth step involving polymerizing of the wax into the water-resistant polymer by introducing the combination into water-soluble polymer during an extrusion process resulting in a homogeneous mixture. A sixth step involving programming the water solubility of the homogeneous mixture. Resulting in the copolymer composition having programmable water solubility, shelf-life stability and quality in the presence of moisture or liquids for a predetermined length of time.

12 Claims, 9 Drawing Sheets

| Group 1 | Inorganic Acids |
|---|---|
| Chlorosulphonic acid<br>Hydrochloric acid (aqueous)<br>Hydrofluoric acid (aqueous)<br>Hydrogen chloride (anhydrous)<br>Hydrogen fluoride (anhydrous)<br>Nitric acid<br>Oleum<br>Phosphoric acid<br>Sulfuric acid | |

Table 1

| Group 2 | Organic Acids |
|---|---|
| Acetic acid<br>Butyric acid (n-)<br>Formic acid<br>Propionic acid<br>Rosin Oil<br>Tall oil | |

Table 2

| Group 3 | Caustics |
|---|---|
| Caustic potash solution<br>Caustic soda solution | |

Table 3

| Group 4 | Amines and Alkanolamines |
|---|---|
| Aminoethylethanolamine<br>Aniline<br>Diethanolamine<br>Diethylenetriamine<br>Disopropanolamine<br>Dimethylamine<br>Ethylenediamine<br>Hexamethylenediamine 2-Methyl-5-ethylpyridine<br>Monoethanolamine<br>Monoisopropanolamine<br>Morpholine<br>Pyridine<br>Triethanolamine<br>Triethlamine<br>Triethylenetetramine<br>Trimethylamine | |

Table 4

| Group 5 | Halogenated Compounds |
|---|---|
| Allyl chloride<br>Carbon tetrachloride<br>Chlorobenzene<br>Chloroform<br>Chlorohydrines, crude Dichlorobenzene (0-)<br>Dichlorobenzene (p-)<br>Dichlorodifluoromethane<br>Dichloroethyl ether<br>Dichloropropane<br>Dichloropropene<br>Ethyl chloride<br>Ethylene dibromide<br>Ethylene dichloride<br>Methyl bromide<br>Methyl chloride<br>Methylene chloride<br>Monochlorodifluoromethane<br>Perchloroethylene<br>Propylene dichloride<br>1,2,4-Trichlorobenzene<br>1,1,1-Trichloroethane<br>Trichloroethylene<br>Trichlorofluoromethane | |

Table 5

| Group 6 | Alcohols, Glycols and Glycol Ethers |
|---|---|
| Ally alcohol<br>Amyl alcohol<br>1,4-Butanediol<br>Butyl alcohol (iso, n, sec, tert)<br>Butylene glycol<br>Corn syrup<br>Cyclohexyl alcohol<br>Decyl alcohol (n, iso)<br>Dextrose solution<br>Diacetone alcohol<br>Diethylene glycol<br>Diethylene glycol dimethyl ether<br>Diethylene glycol monobutyl ether<br>Diethylene glycol monoethyl ether<br>Diethylene glycol monomethyl ether<br>Disobutyl carbitol<br>Dipropylene glycol<br>Dodecanol<br>Ethoxylated dodecanol<br>Ethoxylated pentadecanol<br>Ethoxylated tetradecanol<br>Ethoxylated tridecanol<br>Ethoxytriglycol<br>Ethyl alcohol<br>Ethyl butanol<br>2-Ethylbutyl alcohol<br>2-Ethylhexyl alcohol<br>Ethylene glycol<br>Ethyleneglycol monobutyl ether<br>Ethylene glycol monoethyl ether<br>Ethylene glycol monomethyl ether<br>Furfuryl alcohol<br>Glycerine<br>Heptanol<br>Hexanol<br>Hexylene glycol<br>Isoamyl alcohol<br>Isooctyl alcohol<br>Methyoxytriglycol<br>Methyl alcohol<br>Methylamyl alcohol<br>Molasses, all<br>Nonanol Octanol Pentadecanol<br>Polypropylene glycol methyl ether<br>Propyl alcohols (n, iso)<br>Propylene glycol<br>Sorbitol<br>Tetradecanol<br>Tetraethylene glycol<br>Tridecyl alcohol<br>Triethylene glycol<br>Undecanol | |

Table 6

| Group 7 | Aldehydes |
|---|---|
| Acetaldehyde<br>Acrolein (inhibited)<br>Butyraldehyde (n, iso)<br>Crotonaldehyde<br>Decaldehyde (n, iso)<br>2-Ethy 3-propylacrolein<br>Formaldehyde solutions<br>Furfural<br>Hexamethylenetetramine<br>Isooctyl aldehyde<br>Methyl butyraldehyde<br>Methyl formal<br>Paraformaldehyde<br>Valeraldehyde | |

Table 7

| Group 8 | Ketones |
|---|---|
| Acetone<br>Acetophenone<br>Camphor oil<br>Cyclohexanone<br>Diisobutyl ketone<br>Isophorone<br>Mesityl oxide<br>Methyl ethyl ketone<br>Methyl isobutyl ketone | |

Table 8

| Group 9 | Saturated Hydrocarbons |
|---|---|
| Butane<br>Cyclohexane<br>Ethane<br>Heptane<br>Hexane<br>Iso-butane<br>Liquified natural gas<br>Liquified petroleum gas<br>Methane<br>Nonane n-Paraffins<br>Pentane<br>Petrolatum<br>Petroleum ethers<br>Petroleum naphtha<br>Polybutene<br>Propane<br>Propylene butylene polymer | |

Table 9

| Group 10 | Aromated Hydrocarbons |
|---|---|
| Benzene<br>Cumene p-Cymene<br>Coal tar oil<br>Diethylbenzene<br>Dodecyl benzene<br>Dowtherm<br>Ethylbenzene<br>Naphtha, coal tar<br>Naphthalene (Includes molten)<br>Tetrahdyronaphthalene<br>Toluene<br>Triethyl benzene<br>Xylene (m-, o-, p-) | |

Table 10

| Group 11 | Olefins |
|---|---|
| Butylene<br>1-Decene<br>Dicyclopentadiene<br>Diisobutylene<br>Dipentene<br>Dodecene<br>1-Dodecene<br>Ethylene<br>Liquified petroleum gas<br>Heptane<br>1-Heptene<br>1-Hexane<br>Isobutylene<br>Nonene<br>1-Octene<br>1-Pentene<br>Polybutene<br>Propylene<br>Propylene butylene polymer<br>Propylene tetramer (dodecene)<br>1-Tetradecene<br>1-Tridecene<br>Turpentine<br>1-Undecene | |

Table 11

| Group 12 | Petroleum Oils |
|---|---|
| Asphalt<br>Gasolines<br><br>    •Casingead<br>    •Automotive<br>    •Aviation<br><br>Jet Fuels<br>JP-1 (kerosene)<br>JP-3UP-4<br>JP-5 (kerosene, heavy)<br>Kerosene<br>Mineral spirits<br>Naphtha (non aromatic)<br>Naphtha<br>Stoddard solvent<br>VM&P<br>Absorption oil<br>Clarified oil<br>Crude oil<br>Diesel oil<br>Fuel oil:<br><br>    •No. 1 (kerosene)<br>    •No. 1D No. 2<br>    •No. 2-D<br>    •No. 4<br>    •No. 5<br>    •No. 6<br><br>Oils:<br>    •Lubricating on<br>    •Mineral oil<br>    •Mineral seal oil<br>    •Motor oil<br>    •Penetration oll<br>    •Range oil<br>    •Road oil<br>    •Spindle oil<br>    •Spray oil<br>    •Transformer oil<br>    •Turbine oil | |

Table 12

| Group 13 | Esters |
|---|---|
| Amyl acetate<br>Amyl tallate<br>Butyl acetates (n, iso, sec)<br>Butyl benzyl phthalate<br>Castor oil<br>Croton oil<br>Dibutyl phthalate<br>Diethyl carbonate<br>Dimethyl sulfate<br>Dioctyl adipate<br>Dioctyl phthalate<br>Epoxidized vegetable oils<br>Ethyl acetate<br>Ethyl diacetate<br>Ethylene glycol monoethyl ether acetate<br>Ethylhexyl tallate<br>Fish oil<br>Glycol diacetate<br>Methyl acetate<br>Methyl amyl acetate<br>Neatsfoot oil<br>Olive oil<br>Peanut oil<br>Propyl acetates (n, iso)<br>Resin oil<br>Soya bean oil<br>Sperm oil<br>Tallow<br>Tanner's oil<br>Vegetable oil<br>Wax, carnauba | |

Table 13

| Group 14 | Monomers and Polymerizable esters |
|---|---|
| Acrylic acid (inhibited)<br>Acrylonitrile<br>Butadiene (inhibited)<br>Butyl acrylate (n, iso)<br>Ethyl acrylate (inhibited)<br>2-Ethylhexyl acrylate (inhibited)<br>Isodecyl acrylate (inhibited)<br>Isoprene (inhibited)<br>Methyl acrylate (inhibited)<br>Methyl methacrylate (inhibited)<br>o-Propiolactone<br>Styrene (inhibited)<br>Vinyl acetate (inhibited)<br>Vinyl chloride (inhibited)<br>Vinylidene chloride (inhibited)<br>Vinyl toluene | |

Table 14

| Group 15 | Phenols |
|---|---|
| Carbolic oil<br>Creosote, coal tar<br>Cresols<br>Nonylphenol<br>Phenol | |

Table 15

| Group 16 | Alkylene Oxides |
|---|---|
| Ethylene Oxide<br>Propylene Oxide | |

Table 16

| Group 17 | Cyanohydrins |
|---|---|
| Acetone cyanohydrin<br>Ethylene cyanohydrin | |

Table 17

| Group 18 | Nitriles |
|---|---|
| Acetonitrile<br>Adiponitrile | |

Table 18

| Group 19 | Ammonia |
|---|---|
| Ammonium hydroxide | |

Table 19

| Group 20 | Halogens |
|---|---|
| Bromine<br>Chlorine | |

Table 20

| Group 21 | Phenols |
|---|---|
| Diethyl ether (ethyl ether)<br>1, 4-Dioxane<br>Isopropyl ether<br>Tetrahydrofuran | |

Table 21

| Group 22 | Phosphorus, elemental |
|---|---|

Table 22

| Group 23 | Sulphur, molten |
|---|---|

Table 23

| Group 24 | Acid Anhydride |
|---|---|
| Acetic anhydride<br>Propionic anhydride | |

Table 24

| Group 25 | Polar natural solvents |
|---|---|
| Water | |

Table 25

COPOLYMER WITH PROGRAMMABLE WATER SOLUBILITY

BACKGROUND OF THE INVENTION

1. Other Related Applications.

The present application is a Continuation-In-Part of U.S. patent application Ser. No. 17/203,258, filed on Mar. 16, 2021, now abandoned, which in turn is a Continuation of application Ser. No. 16/913,483 filed on Jun. 26, 2020 now U.S. Pat. No. 10,947,332, which is hereby incorporated by reference.

2. Field of the Invention

The present invention relates to a copolymer composition and, more particularly, to a copolymer composition having a programmable water solubility.

3. Description of the Related Art.

Several designs for water soluble copolymer compositions have been designed in the past. None of them, however, include a copolymer composition that is an environmentally friendly homogeneous mixture with programmable water solubility, allowing the copolymer to maintain its shelf life stability, market-expected quality and stability in the presence of moisture or liquids for a predetermined length of time. Further, the copolymer composition's obsolescence time is manipulated through water solubility programmability by changing the amount of non-water soluble up-cycled resin in the copolymer chain, which improves the usability and functionality of the copolymer. Additionally, the copolymer composition avoids the typical miscibility issues when combing two polymers. Miscibility issues may arise when combing two polymers by molecularly disguising one of the polymers as a polyethylene (PE) wax through a previous process of depolymerization that lowers the particle size and molecular weight of low-density polyethylene (LDPE) enough to allow the for it to be homogenously mixed while maintain adequate molecular weight for it to be polymerized again into the LDPE during manufacturing, as a copolymer. The final amount of LDPE being minimal such that the majority of the copolymer composition remains water soluble and environmentally friendly.

Applicant believes that a related reference corresponds to U.S. Pat. No. 3,997,489 issued to James Newton Coker for melt extrudable polyvinyl alcohol compositions. However, it differs from the present invention because although the Coker reference uses wax to improve the extrusion process, a copolymer with improved water solubility programmability is not created in the art of Coker. Applicant believes that another related reference corresponds to U.S. Pat. No. 6,544,661 issued to Dong Kweon Lee for compositions of polyolefin and polyvinyl alcohol, films, sheets and articles processed therefrom and multilayer products using the same. However, it differs from the present invention because the majority of the copolymer created in the art of Lee is generated from the use of common plastic and not water soluble plastic, unlike the present invention. Thereby resulting in a copolymer blend that is not environmentally friendly. Additionally, the cited art of Lee does not generate a molecular multilayer or uniform copolymer like the present invention does. The lack of the uniform copolymer in the art of Lee means that the generated copolymer blend does not include the same quality of each polymer comprised thereof. The Lee reference results in a plastic blend instead of a homogeneous mixture like that of the present invention.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a copolymer composition with programmable water solubility.

It is another object of this invention to provide a copolymer composition that maintains its quality in the presence of moisture or liquids for a predetermined length of time.

It is still another object of the present invention to provide a copolymer composition that is a homogeneous and uniform.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 1:
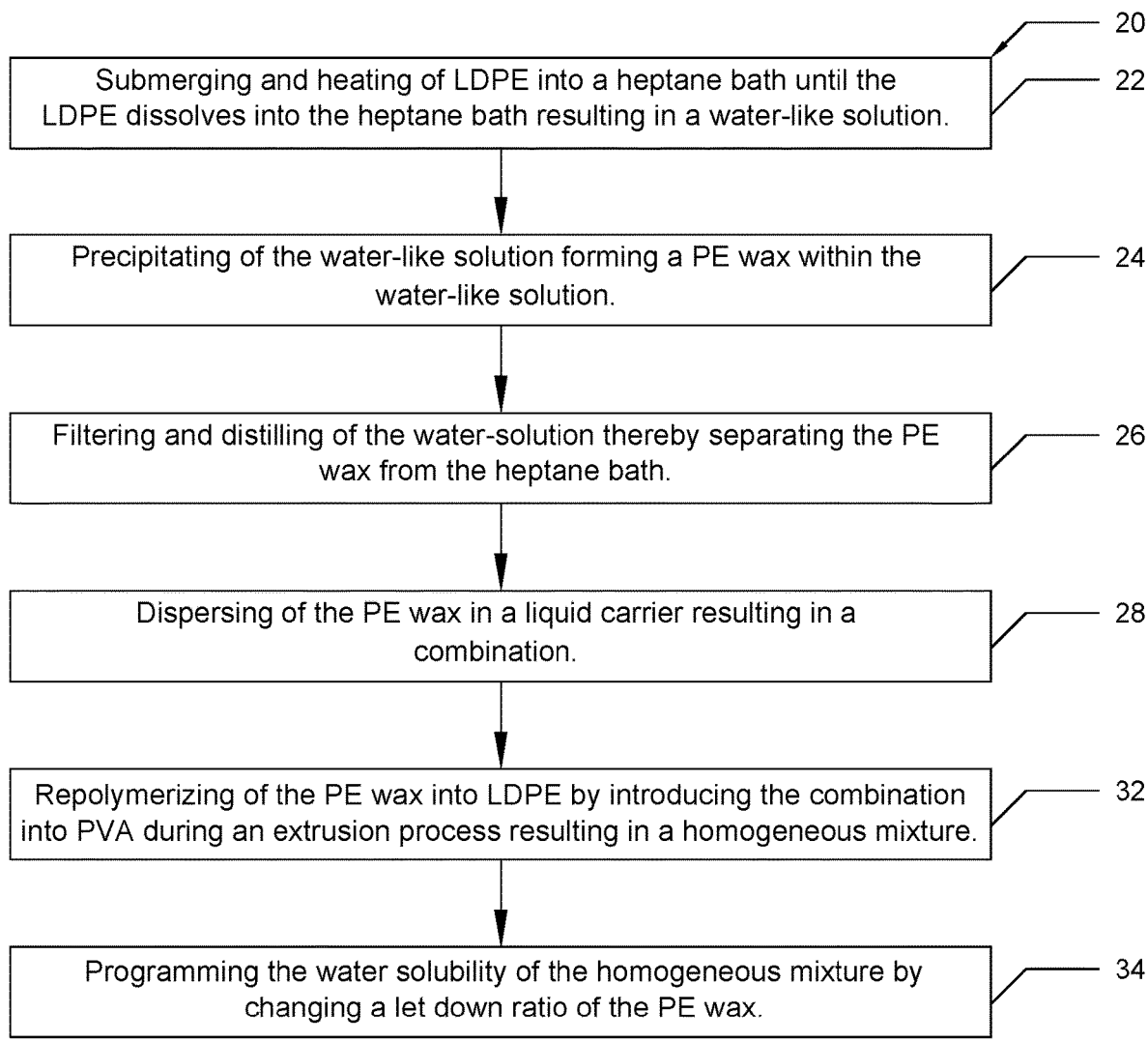
FIG. 1 represents a flowchart of the necessary steps to create a copolymer from polyvinyl alcohol (PVA) and low-density polyethylene (LDPE).

Tables 1-25 are lists of various solvents categorized by groups.

DETAILED DESCRIPTION OF THE EMBODIMENTS OF THE INVENTION

Referring now to the drawings, where the present invention is generally referred to with numeral 10, it can be observed that it basically includes copolymer composition 10 and a method 20 for creating copolymer composition from polyvinyl alcohol (PVA) and a low-density polyethylene (LDPE), and a more general method 40 for creating a copolymer composition from a water-resistant polymer (such as, but not limited to, LDPE) and a water-soluble polymer (such as, but not limited to, PVA).

In one exemplary embodiment, the copolymer composition 10 preferably includes polyvinyl alcohol (PVA) and low-density polyethylene (LDPE). Each individual polymer includes characteristics that allow for successful and useful applications. The desired characteristics of PVA being water solubility. The desired characteristics of LDPE being shelf-life stability and maintaining quality in the presence of moisture. Therefore, combining the characteristics of the PVA and LDPE may be very beneficial. However, mixing of PVA with a fossil-based polymer such as LDPE proves challenging due to issues with molecular miscibility, stability and the potential for a non-homogeneous copolymer to be generated from the mixture. Hence, the present invention overcomes any such issues with method 20 which does not make use of LDPE in its fully polymerized form.

Method 20 includes a first step 22 in which LDPE is submerged into a heptane bath. It may be necessary for the heptane bath to remain at a temperature between 155° and 255° Celsius. It may be necessary for the LDPE to submerged within the heptane bath for 15 through 30 minutes. Preferably, the LDPE may remain submerged in the heptane bath until the LDPE is fully dissolved into the heptane bath resulting in a water-like transparent solution.

In a second step 24, the water-like transparent solution that results from first step 22 undergoes cooling. The water-like transparent solution will then precipitate into polyethylene wax or PE wax, a depolymerized form of LDPE. After a predetermined length of time, the PE wax will start forming at the bottom of the water-like transparent solution.

It is to be understood that the water-like transparent solution becomes a white solution after second step 24. In a third step 26, filtration and distillation to the now white solution occurs. The filtration of the white solution causes for white thicker solution to be separated from the heptane. The thicker solution may be heated at 70° Celsius, to remove any heptane still present through distillation, resulting in a very thin white powder to emerge. It is to be understood that the very thin white powder is a particular type of wax, PE wax in one instance. The PE wax may be from second step 24. The white powder helps to form a viscous cloudy liquid when molten. The very thin white powder may preferably have the particle size of a solid color pigment. This is small enough to allow the very thin white powder to be easily and homogeneously assimilated and disguised as a color additive in an extrusion process in which PVA is being used for water soluble applications, at a later step of method 20.

In a fourth step 28, the white powder from third step 26 is dispersed in a liquid carrier. The liquid carrier may be synthetic or natural with a high smoke point. The white powder being dispersed in a liquid carrier results in a combination that can be used during extrusion.

It is to be understood that the very thin white powder was importantly created to be at the verge of polymerization, by maintaining a small particle size but a high molecular weight, hence there is a need for the white powder to reach an additional melting point before being united with PVA and becoming LDPE-PVA copolymer. In a fifth step 32, the resulting combination of fourth step 28 is introduced in the extrusion process with PVA. Resulting in the polymer chain being made to accept the PE wax, disguised as a color pigment, to create a homogeneous mixture containing both, PVA and PE wax. The heat and pressure present during the extrusion process will repolymerize the PE wax or white powder into LDPE. Due to the white powder being previously forced within the PVA a copolymer matrix will result. The copolymer matrix being actual LDPE containing PVA or copolymer composition 10.

In a sixth step 34, water solubility for the resulting copolymer composition is programmed and manipulated by changing a letdown ratio of the PE wax. Water solubility can be programmed as water solubility of the copolymer is proportional to the amount of PE wax used during extrusion. It may also be possible to estimate water solubility with the following function: F(LDPE)=PVA−Copolymer composition. If beginning at a letdown ratio of 0.1-0.5% of the combination from fourth step 28, a water solubility decreases of 5%-10% is achieved, but the resulting material or copolymer will remain 99.5%-99.9% water soluble. It is to be understood that for particular single use products requiring a particular shelf life, a higher letdown ratio may be necessary. Despite the higher letdown ratio, water solubility will remain high to achieve a programmable shelf life, useful lifespan and a shorter environmental lifespan all simultaneously.

Figure 2:
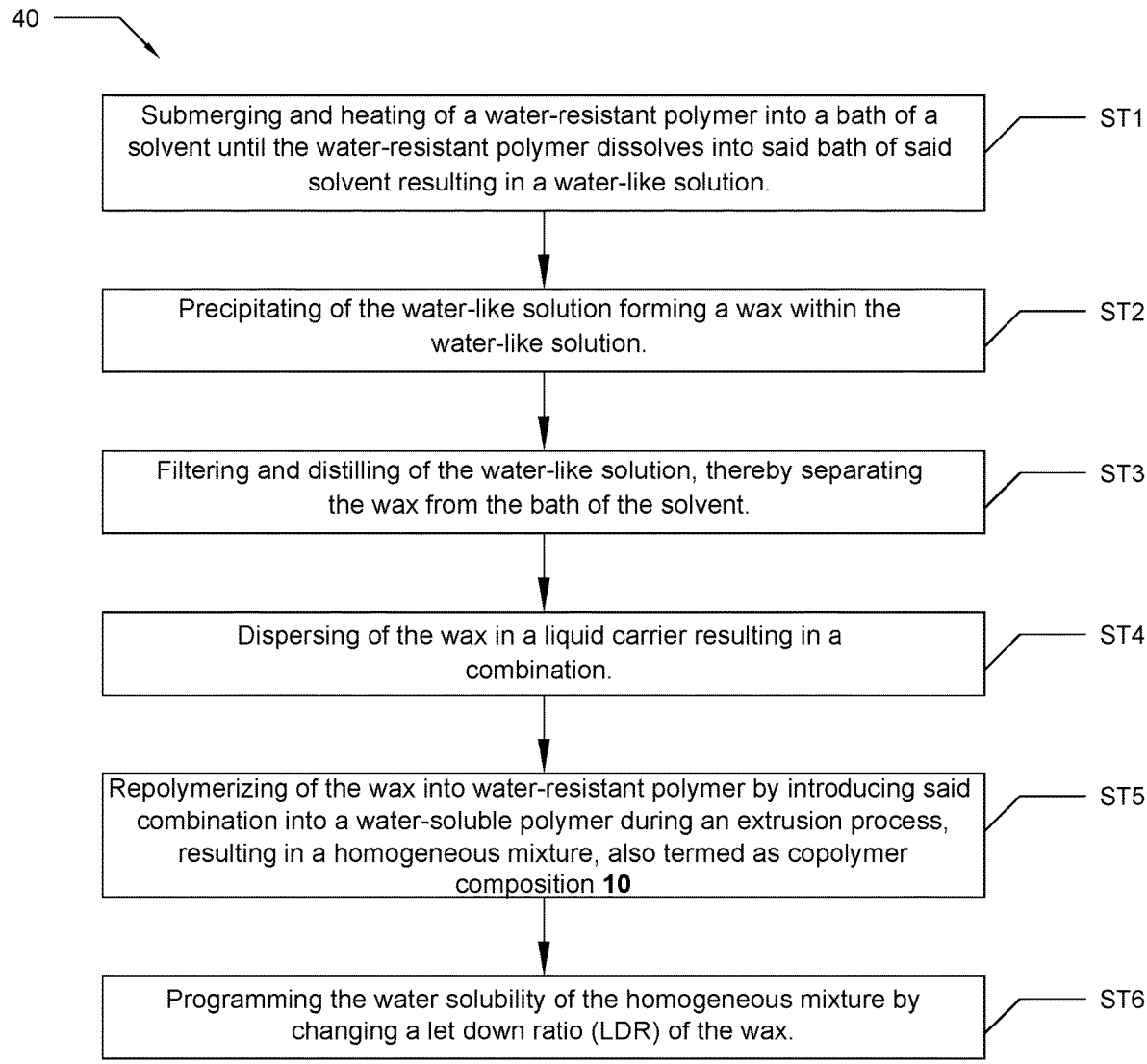
FIG. 2 represents a flowchart of the necessary steps to create a copolymer from a water-soluble polymer and a water resistant polymer.
Figure 3:
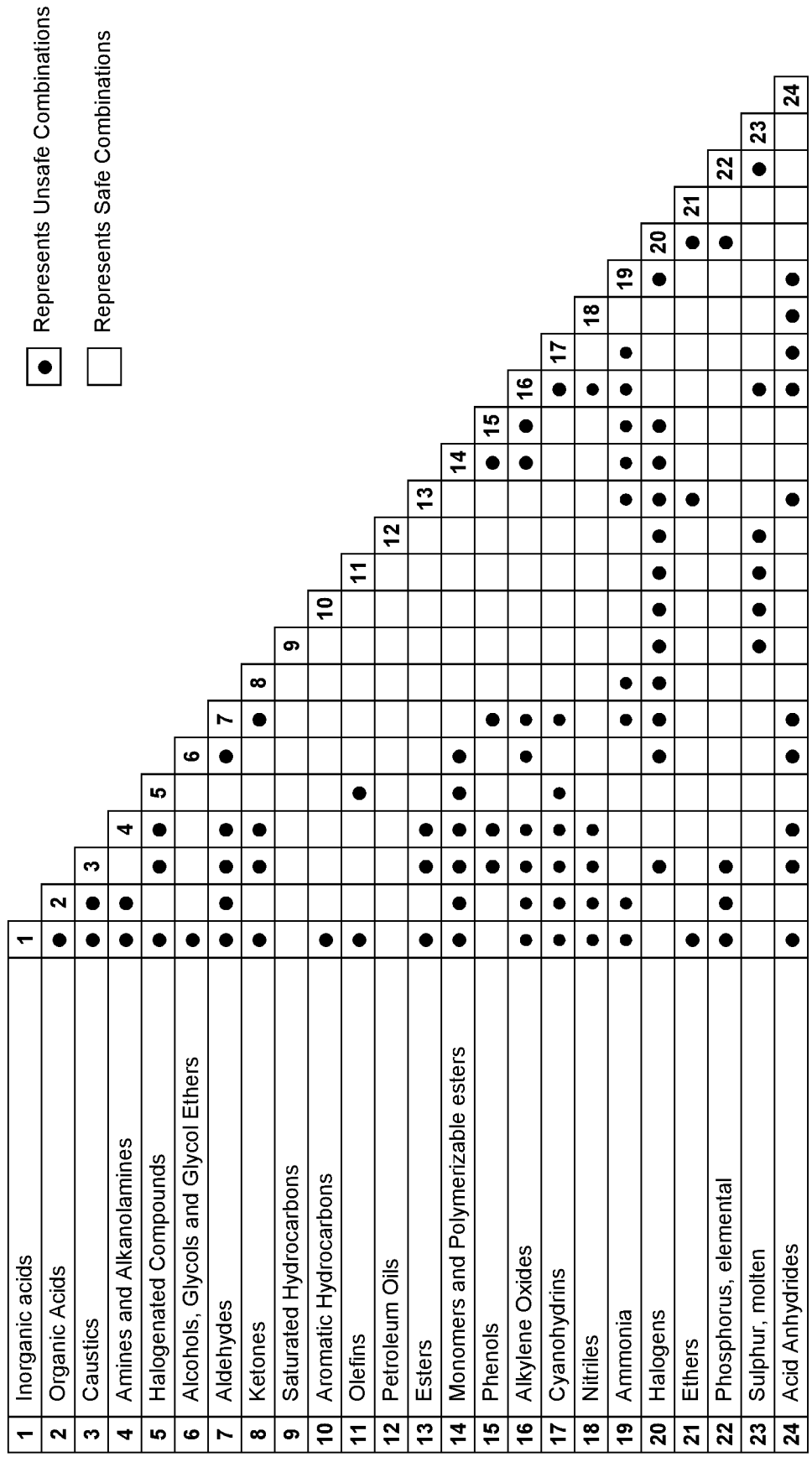
FIG. 3 is an exemplary chart of chemical compatibility.

The above described process can be repeated but in a more general way, as seen in FIG. 2 related to method 40, wherein the copolymer composition 10 may be the result of a combination of two other polymers, one water-soluble and one water-resistant polymer (previously, the claimed method limited the water-soluble polymer to be PVA and the water resistant polymer to be LDPE). This is only feasible if the above described method for said PVA and the low density polyethylene (PE) dissolved in heptane may be repeated with any other suitable water soluble thermoplastic material (instead of said PVA) but with the key characteristic of being hydrophilic/water soluble chain which then may be co-extruded with another hydrophobic/water resistant dissolved polymer chain such as, but not limited to, Polyhydroxylalkanoate (PHA) dissolved in a liquid capable to depolymerize it down to a wax state for it to then be co-extruded with the water soluble material as described above. In order to define what solvents may be used to dissolve each hydrophobic/water resistant polymer chain intended to be used as a new combination, conventional charts for chemical compatibility, as widely known in the art, may be used for reference (see FIG. 3 and Tables 1-24). Such conventional charts are customary and have been widely studied and used as the canon for organic chemistry reactions and solutions. Using such charts as guidelines from Organic Chemistry's canon science, any suitable solvent may be able to dissolve any thermoplastic material down to a wax state. In exemplary embodiments thereof, even the strongest of plastics such as Polytetrafluoroethylene (PTFE, also known as Teflon) which is well known to be dissolved by Fluorine for example. Chart from FIG. 3 is herein included for explanatory purposes, nonetheless, it should be understood that any conventional chart that conveys different chemical compatibilities within the scope of the field herein described may be used to determine what solvent may be used based on the selected water-resistant polymer. Chart of FIG. 3 is from Thermo Fisher Scientific Inc.

Paring any hydrophobic/water resistant thermoplastic polymer material with a compatible solvent listed in Tables 1-25 (listed in 25 groups) may render a wax state depolymerized version of said thermoplastic material, also termed as dissolved wax, and just like said low-density PE dissolved in the heptane bath may create PE wax (as described above). Said dissolved was from any suitable thermoplastic hydrophobic/water resistant material (after being dissolved into a wax state by a compatible solvent) may be used as an additive in the extrusion of any compatible hydrophilic/water soluble polymer. Thereby, said wax may then increase its molecular weight while being extruded given the extrusion's high temperature, which may be customarily set to match the melting point of the plastic being extruded.

Given that the wax, in its depolymerized state and physical size, is thermomechanically unobtrusive and reactively inert, said wax may be absorbed homogeneously by the hydrophilic/water soluble polymer chain, thereby, creating a copolymer in new stable material with the added benefit of having both water solubility and limited water resistance, which may necessary to be a feasible conventional plastics' substitution material. The resulting polymer having the novel ability to properly perform as expected for a programmed period of time by which then said polymer, in its various exemplary embodiments, may dissolve in the presence of water (which is the most abundant and available solvent on the planet), thus reducing the ability and probability of plastic waste to generate non-soluble microparticles known to become a toxic biomagnification factor. The water resistance's capabilities of the novel material will depend on the amount and type of wax used in the copolymerization process, which can come from a bio-based form.

On the foregoing, the method 40 as shown in FIG. 2, includes a ST 1 in which water-resistant polymer is submerged into a solvent bath. It may be necessary for the solvent bath to remain at a predetermined temperature. Said predetermined temperature may be calculated as follows: $O\_min = (T/E\_min) \times 100$; $O\_max = (T/E\_max) \times 100$; $O\_av = (T/E\_av) \times 100$. Wherein T=used solvent's boiling point (T value may vary depending on the solvent, however, such a value is well studied and documented, so that anyone skilled one may be able to find it in the prior art). E=constant for solvent's maximum thermal energy before volatilization, which happens to be a function of the solvent's boiling point. These constants are two; to obtain maximum temperature value calculated with the constant $E\_max = 38.59$, and a minimum value calculated with the constant $E\_min = 63.48$, furthermore an average value may also be used $E\_av = 51.04$. These constants (E_max, E_min and E_av) were derived from experimentation and represent the best range of optimal performance for solvents. In addition, these numbers (E_max, E_min and E_av) are a percentage of the solvent's boiling point, at which percentage it has the maximum thermal energy prior to volatilization. Finally O=Optimal temperature for dissolution. Take for instance, the following example: solvent to be used: Heptane; T(Heptane)=98.4° C.; E=E_max=38.59, thence, O_max (heptane)=(98.4C/38.59)×100=254.988C and O_min(heptane)=(98.4C/63.48)×100=155.009C. As described above, it may be necessary for the heptane bath to remain at a temperature between 155° and 255° Celsius, which is the calculated temperature range optimal for dissolution. The above formula can be applied to any solvent from the art, especially those shown in Tables 1-24. It may be necessary for the water-resistant polymer to be submerged within the solvent bath for 15 to 30 minutes, however, such a time interval can be calculated from an experimental standpoint, the main idea it to let the water-resistant polymer to sit in the solvent bath until it is visible that the polymer has fully dissolved resulting in a water-like transparent solution.

In a ST 2, the water-like transparent solution that results from ST 1 may undergo a cooling stage. The water-like transparent solution will then precipitate into a wax, wherein said wax is a depolymerized form of said water-resistant polymer. After a predetermined length of time, the wax will start forming at the bottom of the water-like transparent solution. It should be understood that the water-like transparent solution may become a white solution after finishing ST 2.

In a ST 3, filtration and distillation to the white solution occurs. The filtration of the white solution causes a white thicker solution to be separated from the solvent. The thicker solution may be heated at a predetermined temperature, to remove any solvent still present through distillation, resulting in a very thin white powder to emerge. Nonetheless, depending on the water-resistant polymer and the solvent used, the water-resistant polymer may dissolve into a non-Newtonian liquid, or a liquid, wherein colors may vary from transparent to white. But after precipitation, they do become white powders. It is to be understood that the very thin white powder is a particular type of wax. The wax may be from ST 2. The white powder helps to form a viscous cloudy liquid when molten. The very thin white powder may preferably have the particle size of a solid color pigment. This is small enough to allow the very thin white powder to be easily and homogeneously assimilated and disguised as a color additive in an extrusion process in which a water-soluble polymer may be used for water soluble applications, at a later step of method 40.

In a ST 4, the white powder from ST 3 is dispersed in a liquid carrier. The liquid carrier may be synthetic or natural with a high smoke point. The white powder being dispersed in a liquid carrier results in a combination that can be used during extrusion.

It is to be understood that the very thin white powder was importantly created to be at the verge of polymerization, by maintaining a small particle size but a high molecular weight, hence there is a need for the white powder to reach an additional melting point before being united with the water-soluble polymer and becoming what may be termed as a hydrophobic-hydrophilic copolymer. In a ST 5, the resulting combination of ST 4 is introduced in the extrusion process with said water-soluble polymer. Resulting in the polymer chain being made to accept the wax, disguised as a color pigment, to create a homogeneous mixture containing both, the water-soluble polymer and the wax. The heat and pressure present during the extrusion process will repolymerize the wax or white powder into said water-resistant polymer. Due to the white powder being previously forced within the water-soluble polymer a copolymer matrix will result. The copolymer matrix being actual water-resistant polymer containing water-soluble polymer or copolymer composition 10.

In a ST 6, water solubility of the resulting copolymer composition is programmed and manipulated by changing a let down ratio (LDR) of the wax. Water solubility can be programmed as water solubility of the copolymer is proportional to the amount of wax used during extrusion. It may also be possible to estimate water solubility with the following function: F(water-resistant polymer)=Water-Soluble Polymer–Copolymer composition. If beginning at a letdown ratio of 0.1-0.5% of the combination from fourth step 28, a water solubility decrease of 5%-10% is achieved, but the resulting material or copolymer will remain 99.5%-99.9% water soluble It is to be understood that for particular single use products requiring a particular shelf life, a higher LDR may be necessary. Despite the higher LDR, water solubility will remain high to achieve a programmable shelf life, useful lifespan and a shorter environmental lifespan all simultaneously.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for producing a copolymer composition, comprising:
  a) submerging a water resistant polymer into a bath of a solvent, also referred to as solvent bath, and heating said solvent bath until the water-resistant polymer dissolves into the solvent bath resulting in a water-like solution;
  b) forming a wax within the water-like solution by precipitating the wax from the water-like solution;

c) dispersing the wax in a liquid carrier resulting in a combination;

d) repolymerizing the wax into the water resistant polymer by introducing the combination into water-soluble polymer during an extrusion process resulting in a homogeneous copolymer mixture; and e) programming the water solubility of the homogeneous copolymer mixture by changing a letdown ratio of the wax, said homogenous copolymer mixture defined as the copolymer composition.

2. The method of claim 1, further including selecting a compatible solvent, depending on the water-resistant polymer, so that the solvent dissolves said water-resistant polymer into a wax state at a verge of polymerization.

3. The method of claim 2 wherein said solvent bath is maintained at a predetermined temperature range.

4. The method of claim 3, wherein a lower temperature limit from said predetermined temperature range is calculated as $O\_min=(T/E\_min)\times 100$; wherein said $O\_min$ is a minimum optimal temperature for dissolution; wherein said T is a boiling point of said solvent; and $E\_min$ is a constant value of 63.48.

5. The method of claim 3, wherein an upper temperature limit from said predetermined temperature range is calculated as $O\_max=(T/E\_max)\times 100$; wherein said $O\_max$ is a maximum optimal temperature for dissolution; wherein said T is a boiling point of said solvent; and $E\_min$ is a constant value of 38.59.

6. The method of claim 1 wherein said solvent is a liquid that causes depolymerization of said water resistant polymer.

7. The method of claim 1 wherein said resistant polymer is submerged within said solvent bath for a length of time between 15 and 30 minutes.

8. The method of claim 1 wherein said water-like solution, after precipitating, forms said wax, wherein said wax is a thin powder.

9. The method of claim 8 wherein the thin powder forms a viscous cloudy liquid when molten.

10. The method of claim 1 wherein said liquid carrier is synthetic or natural, said liquid carrier further having a high smoke point.

11. The method of claim 1 wherein water solubility of the homogeneous copolymer mixture is proportional to an amount of the wax used.

12. The method of claim 1, wherein the homogeneous copolymer mixture has a programmable shelf life and a short environmental lifespan.

* * * * *